US009247535B2

United States Patent
Hu et al.

(10) Patent No.: US 9,247,535 B2
(45) Date of Patent: *Jan. 26, 2016

(54) RESOURCE SELECTION FOR TRANSMISSION OF MULTIPLE ACK/NACK ON PUCCH CHANNEL

(71) Applicant: Optis Wireless Technology, LLC, Plano, TX (US)

(72) Inventors: Yang Hu, Beijing (CN); David Astely, Bromma (SE); Jung-Fu Cheng, Cary, NC (US); Sorour Falahati, Stockholm (SE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,676

(22) Filed: Jan. 2, 2015

(65) Prior Publication Data

US 2015/0117276 A1 Apr. 30, 2015

Related U.S. Application Data

(63) Continuation of application No. 13/768,019, filed on Feb. 15, 2013, now Pat. No. 8,929,261, which is a continuation of application No. 12/467,086, filed on May 15, 2009, now Pat. No. 8,379,547.

(51) Int. Cl.
| | |
|---|---|
| *H04W 72/04* | (2009.01) |
| *H04L 1/18* | (2006.01) |
| *H04L 5/14* | (2006.01) |
| *H04L 5/00* | (2006.01) |

(52) U.S. Cl.
CPC ......... *H04W 72/0413* (2013.01); *H04L 1/1854* (2013.01); *H04L 1/1861* (2013.01); *H04L 5/0053* (2013.01); *H04L 5/0092* (2013.01); *H04L 5/14* (2013.01); *H04L 5/0007* (2013.01); *H04L 5/0016* (2013.01)

(58) Field of Classification Search
None
See application file for complete search history.

(56) References Cited

U.S. PATENT DOCUMENTS

| 8,379,547 B2 * | 2/2013 | Hu et al. ............... 370/278 |
| 8,929,261 B2 * | 1/2015 | Hu et al. ............... 370/280 |
| 2010/0074210 A1 * | 3/2010 | Gaal et al. ............ 370/329 |
| 2010/0272048 A1 * | 10/2010 | Pan et al. ............. 370/329 |
| 2010/0281326 A1 * | 11/2010 | Ahn et al. ............. 714/749 |
| 2011/0176443 A1 * | 7/2011 | Astely et al. .......... 370/252 |

* cited by examiner

*Primary Examiner* — Brian D Nguyen
*Assistant Examiner* — Roberta A Shand (57) ABSTRACT

In a method of operating a communication network (20) a time division duplex (TDD) frame (F) of information is communicated over a radio interface (32) between a wireless terminal (30) and a base station node (28). The method comprises the wireless terminal (30) receiving plural downlink (DL) subframes of the frame and, in response thereto, configuring a Physical Uplink Control Channel (PUCCH) channel to comprise up to four acknowledgements by using only two PUCCH channel resources and using PUCCH format 1a or PUCCH format 1b. In an example embodiment a PUCCH channel resource is specified by a sequence utilized for transmission of at least part of the PUCCH channel and a cyclical shift applied to the sequence. The two sequences of the respective two PUCCH resources are orthogonal, and the cyclical shift of the two PUCCH resources can be in a frequency domain, a time domain, or both the frequency domain and the time domain.

9 Claims, 7 Drawing Sheets

RESOURCE SELECTION FOR TRANSMISSION OF MULTIPLE ACK/NACK ON PUCCH CHANNEL

This application is a continuation of U.S. patent application Ser. No. 12/467,086 filed May 15, 2009, the entire contents of which are incorporated herein by reference.

TECHNICAL FIELD

This invention pertains to telecommunications, and particularly to providing uplink acknowledgement with respect to multiple downlink entities such as subframes.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB", "B node", or (in LTE) eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of radio access networks, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). An entity known as the Third Generation Partnership Project (3GPP) has undertaken to evolve further the UTRAN and GSM based radio access network technologies.

Specifications for the Evolved Universal Terrestrial Radio Access Network (E-UTRAN) are ongoing within the $3^{rd}$ Generation Partnership Project (3GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNBs, providing evolved UTRA user-plane and control-plane protocol terminations toward the wireless terminal. The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The Long Term Evolution (LTE) standard is based on multi-carrier based radio access schemes such as Orthogonal Frequency-Division Multiplexing (OFDM) in the downlink and SC-FDMA in the uplink. The Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion.

There are two basic types of frame structures for LTE. The first type of frame structure pertains to Frequency Division Duplex (FDD). The second type of frame structure (the more pertinent of the two types to the technology disclosed herein) pertains to Time Division Duplex (TDD) and is described, e.g., in 3GPP TS 36.211 V8.5.0 (2008-12) 3rd Generation Partnership Project; Technical Specification Group Radio Access Network; Evolved Universal Terrestrial Radio Access (E-UTRA); Physical Channels and Modulation (Release 8), incorporated by reference herein in its entirety. The second type of LTE frame structure comprises ten subframes. As shown in Table 4.2-2 of in 3GPP TS 36.211 V8.5.0 (2008-12) section 4.2) the second type of LTE frame structure can have six differing uplink-downlink configurations (with differing numbers of downlink (DL) subframes, uplink (UL) subframes, and special subframes).

In the time domain, each LTE subframe (having 1 ms duration) is divided into two slots, each slot being 0.5 ms in duration. The transmitted signal in each slot is described by a resource grid of subcarriers and symbols. Each element in the resource grid is called a resource element (RE) and is uniquely defined by an index pair (k, l) in a slot (where k and l are the indices in the frequency and time domain, respectively). In other words, one symbol on one sub-carrier is a resource element (RE). Each symbol thus comprises a number of sub-carriers in the frequency domain, depending on the channel bandwidth and configuration. See, e.g., 3GPP TS 36.211 V8.5.0 (2008-12) section 5.2.

In Long Term Evolution (LTE) no dedicated data channels are used, instead shared channel resources are used in both downlink and uplink. These shared resources, e.g., the downlink shared channel (DL-SCH) and the uplink shared channel (UL-SCH) are each controlled by one or more schedulers that assign(s) different parts of the downlink and uplink shared channels to different UEs for reception and transmission respectively.

The assignments for the downlink shared channel (DL-SCH) and the uplink shared channel (UL-SCH) are transmitted in a control region covering a few OFDM symbols in the beginning of each downlink subframe. Each assignment for downlink shared channel (DL-SCH) or uplink shared channel (UL-SCH) is transmitted on a physical channel named the Physical Downlink Control Channel (PDCCH) in the control region. A Physical Downlink Control Channel (PDCCH) is mapped to (e.g., comprises) a number of control channel element (CCE). Each control channel element (CCE) consists of thirty six resource elements (REs). The total number of available control channel element (CCEs) in a subframe will vary depending on several parameters like number of OFDM symbols used for PDCCH, number of antennas, system bandwidth, Physical HARQ Indicator Channel (PHICH) size, etc.

There are three basic physical channels and a reference signal (RS) on the LTE uplink. An uplink physical channel corresponds to a set of resource elements which carry information from higher layers. The LTE uplink includes the following three physical channels: the Physical Uplink Shared Channel (PUSCH); the Physical Uplink Control Channel (PUCCH); and the Physical Random Access Channel (PRACH). The uplink physical signal is used by the physical layer but does not carry information originating from higher layers.

The Physical Uplink Control Channel (PUCCH) carries uplink control information and supports multiple formats. The supported formats and their respective modulation schemes are described in Table 5.4-1 of section 5.4 of 3GPP TS 36.211 V8.5.0 (2008-12). Among the formats here of primary interest are format 1a (having a BPSK modulation scheme) and format 1b (having a QPSK modulation scheme). The modulation schemes of format 1a and format 1b are also described with reference to Table 5.4.1-1 of section 5.4 of 3GPP TS 36.211 V8.5.0 (2008-12), which is reproduced as Table 1 below.

TABLE 1

| PUCCH format | $b(0), \ldots, b(M_{bit} - 1)$ | d(0) |
| --- | --- | --- |
| 1a | 0 | 1 |
|    | 1 | −1 |
| 1b | 00 | 1 |
|    | 01 | −j |
|    | 10 | j |
|    | 11 | −1 |

As alluded to previously, one property of Time Division Duplex (TDD) is that the number of UL and DL subframes can be different. In the configurations where there are more DL subframes than UL subframes, multiple DL subframes are associated with one single UL subframe for the transmission of the corresponding control signal. For example, for each dynamically scheduled transmission in the DL subframes, acknowledgement/negative acknowledgement (ACK/NACK) bits need to be transmitted in an associated UL subframe to support proper Automatic Repeat Request (ARQ) or Hybrid Automatic Repeat Request (HARQ) operation. For example, if a wireless terminal is scheduled in a multiple of DL subframes which are all associated with one UL subframe, the wireless terminal needs to transmit multiple ACK/NACK bits in that UL subframe.

Thus, in LTE TDD any asymmetry in the downlink (DL)/uplink (UL) configuration results in multiple simultaneous ACK/NACK feedbacks for one wireless terminal (UE) on the uplink control channel (PUCCH) in case of heavy downlink (DL) transmission. Table 2 shows the number of DL subframes associated with each UL subframe for each of the aforementioned six DL/UL TDD configurations.

TABLE 2

|  |  | Subframe index n | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| DL:UL | 0 |  |  | 1 | 0 | 1 |  |  | 1 | 0 | 1 |
| config- | 1 |  |  | 2 | 1 |  |  |  | 2 | 1 |  |
| urations | 2 |  |  | 4 |  |  |  |  | 4 |  |  |
|  | 3 |  |  | 3 | 2 | 2 |  |  |  |  |  |
|  | 4 |  |  | 4 | 4 |  |  |  |  |  |  |
|  | 5 |  |  | 9 |  |  |  |  |  |  |  |
|  | 6 |  |  | 1 | 1 | 1 |  |  | 1 | 1 |  |

The cells in Table 2 which have no numbers are understood to be associated with downlink subframes. Except for configuration 5, up to four DL subframes are associated with one UL subframe, which needs up to eight ACK/NACK feedbacks in case of MIMO on PUCCH (since there are two antenna elements for the downlink (DL) for MIMO). For configuration 5, up to as many as eighteen ACK/NACK feedbacks may be necessary on PUCCH. Having so many ACK/NACKs can result in a big payload for PUCCH to carry and further limits PUCCH coverage.

In view of the effect of the taxing effect of a potentially large number of ACK/NACKs being carried on PUCCH, a scheme of ACK/NACK "bundling" has been proposed. TSG-RAN WB1 #52, R1-081110, 'Multiple ACK/NAK for TDD', Ericsson, Motorola, Nokia, Nokia Siemens Networks, Qualcomm. Typically in such bundling ACK/NAKs from one or several DL subframes are combined ("bundled") by performing a logical AND operation of all ACK/NACKs to result in a single ACK/NAK report. Yet ACK/NACK bundling can cause unnecessary retransmission, since all packets in the bundling window must be retransmitted if there is even one packet received incorrectly. Consequently, adopting ACK/NACK bundling across a system typically reduces downlink (DL) throughput. See, e.g., 3GPP TSG RAN WB1 #53, R1-081988, 'Support of Multiple ACK/NAK Transmission in TDD', Texas Instruments.

In some situations it is desired to obtain a tradeoff between PUCCH coverage and downlink (DL) efficiency by, e.g., supporting multiple ACK/NACK with some kinds of methods on reducing payload. For example, some scenarios performing a bundling operation only in the spatial domain or the temporal domain (but not both). These scenarios can provide more information for eNodeB to do flexible scheduling. For example, when only spatial bundling is adopted for each downlink (DL) subframe, there are only two ACK/NACKs in the case of two DL subframes; three ACK/NACKs in the case of three DL subframes; and four ACK/NACKs in case of four DL subframes. In addition, for configuration 5 of Table 2, some form of bundling can be applied to further limit the payload, e.g. four ACK/NACK feedbacks.

Currently there are two main proposals for supporting the transmission of up to four ACK/NACK with targeting to make a tradeoff between ACK/NACK bundling and the actual number of ACK/NACK feedbacks. These two proposed solutions are respectively referred to herein as the "resource reserved solution" and the "channel coding solution".

The resource reserved solution is based on PUCCH format 1a/1b and is described, e.g., in 3GPP TSG RAN WB1 #53, R1-081988, 'Support of Multiple ACK/NAK Transmission in TDD', Texas Instruments [incorporated herein by reference]. In the resource reserved solution, multiple PUCCH resources should be reserved in terms of the number of downlink (DL) subframes to provide multiple PUCCH channels to be selected. Multiple ACK/NACK bits are jointly coded to select a BPSK/QPSK symbol and a corresponding PUCCH channel as the transmission structure of format 1a or format 1b. The reserved PUCCH resources are derived from multiple DL subframes, or from multiple CCEs in one DL subframe.

There are several drawbacks of the resource reserved solution. A first drawback is that more PUCCH resources should be reserved when the number of downlink (DL) subframes increases, e.g. four PUCCH resources are needed in case of four downlink (DL) subframes. A second drawback is that the reserved PUCCH resources maybe vary each time and depend on downlink (DL) subframes or the CCE in each DL subframe. In other words, the solution needs and involves more downlink (DL) information as the mapping rule, especially with the increasing of DL subframes. Further, possibly part of the information will be lost if some DL assignments are missing, which results in confusion on the association between DL CCE and PUCCH resources. A third drawback is that correct detection depends on the joint detection of both BPSK/QPSK symbols and the used PUCCH channel. A fourth drawback is that the eNodeB will do blind detection among all reserved PUCCH channels.

The channel coding solution together with discontinuous transmission (DTX) is based on format 2 and is described in TSG-RAN WG1 #53, R1-082001, 'On Multiple ACK/NAK for LTE TDD', Ericsson [incorporated herein by reference]. In the channel coding solution, in order to reuse existing PUCCH format 2, Reed Muller codes are also used for the coding of multiple ACK/NACK, the same as CQI reporting. There are also several drawbacks to the channel coding solution. A first drawback is that this solution requires a PUCCH format 2 resource, and hence higher layer configuration similar to CQI reporting, which will result in different transmission structure for different TDD configurations, such as one or two ACK/NACK (format 1a/1b) and more than two ACK/NACK (format 2). Another drawback occurs, e.g., in the case of small payload, in which some Reed Muller codes may not be optimized codes (e.g., simplex codes are superior to Reed Muller codes at rate 2/20, for example).

For two downlink (DL) subframes, the resource reserved solution is a better solution than the channel coding solution (since, e.g., the Reed Muller code [20,2] is not a optimized code). For four downlink (DL) subframes, the two solutions have very close performance.

What is needed, therefore, and an object of the technology disclosed herein, are method and apparatus for providing ACK/NACK on the PUCCH in a manner that balances PUCCH coverage and downlink (DL) efficiency.

SUMMARY

In one of its aspects the technology disclosed herein concerns a wireless terminal comprising a transceiver and a frame handler. The transceiver is configured to communicate a time division duplex (TDD) frame of information over a radio interface with a base station node. The frame handler is configured to prepare a Physical Uplink Control Channel (PUCCH) channel comprising up to four acknowledgements by using only two PUCCH channel resources and using PUCCH format 1a or PUCCH format 1b.

In one of its aspects the technology disclosed herein concerns a method of operating a communication network wherein a time division duplex (TDD) frame of information is communicated over a radio interface between a wireless terminal and a base station node. The method comprises the wireless terminal receiving plural downlink (DL) subframes of the frame and, in response thereto, configuring a Physical Uplink Control Channel (PUCCH) channel to comprise up to four acknowledgements by using only two PUCCH channel resources and using PUCCH format 1a or PUCCH format 1b.

In an example embodiment a PUCCH channel resource is specified by a sequence utilized for transmission of at least part of the PUCCH channel and a cyclical shift applied to the sequence. The two sequences of the respective two PUCCH resources are orthogonal, and the cyclical shift of the two PUCCH resources can be in a frequency domain, a time domain, or both the frequency domain and the time domain.

In an example embodiment and mode wherein the PUCCH channel is configured as comprising two acknowledgements for two respective downlink (DL) subframes the method further comprises mapping a first acknowledgement bit to a BPSK constellation and including the BPSK constellation in the PUCCH channel; using a second acknowledgement bit to select one of the two PUCCH channel resources for transmission of the PUCCH channel; and, using the PUCCH format 1a for the PUCCH.

In an example embodiment and mode wherein the PUCCH channel is configured as comprising three acknowledgements for three respective downlink (DL) subframes the method further comprises mapping a first acknowledgement bit and a second acknowledgement bit to a QPSK constellation and including the QPSK constellation in the PUCCH channel; using a second acknowledgement bit to select one of the two PUCCH channel resources for transmission of the PUCCH channel; and, using the PUCCH format 1b for the PUCCH.

In an example embodiment and mode wherein the PUCCH channel is configured as comprising four acknowledgements for four respective downlink (DL) subframes the method further comprises mapping a first acknowledgement bit and a second acknowledgement bit to a QPSK constellation; and, using a combination of the third acknowledgement bit and a fourth acknowledgement bit to select one of the two PUCCH channel resources for transmission of a first part of the PUCCH channel and to select one of the two PUCCH channel resources for transmission of a second part of the PUCCH channel.

In another of its aspects the technology disclosed herein concerns a base station of a communications network. The base station comprises a base station frame handler configured to allocate only two PUCCH channel resources to a wireless terminal and a transceiver configured to communicate a time division duplex (TDD) frame of information over a radio interface with the wireless terminal. The base station frame handler is further configured to detect up to four acknowledgements in a Physical Uplink Control Channel (PUCCH) channel received from the wireless terminal by knowing the two PUCCH channel resources and that the acknowledgements are in accordance with PUCCH format 1a or PUCCH format 1b.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 1:
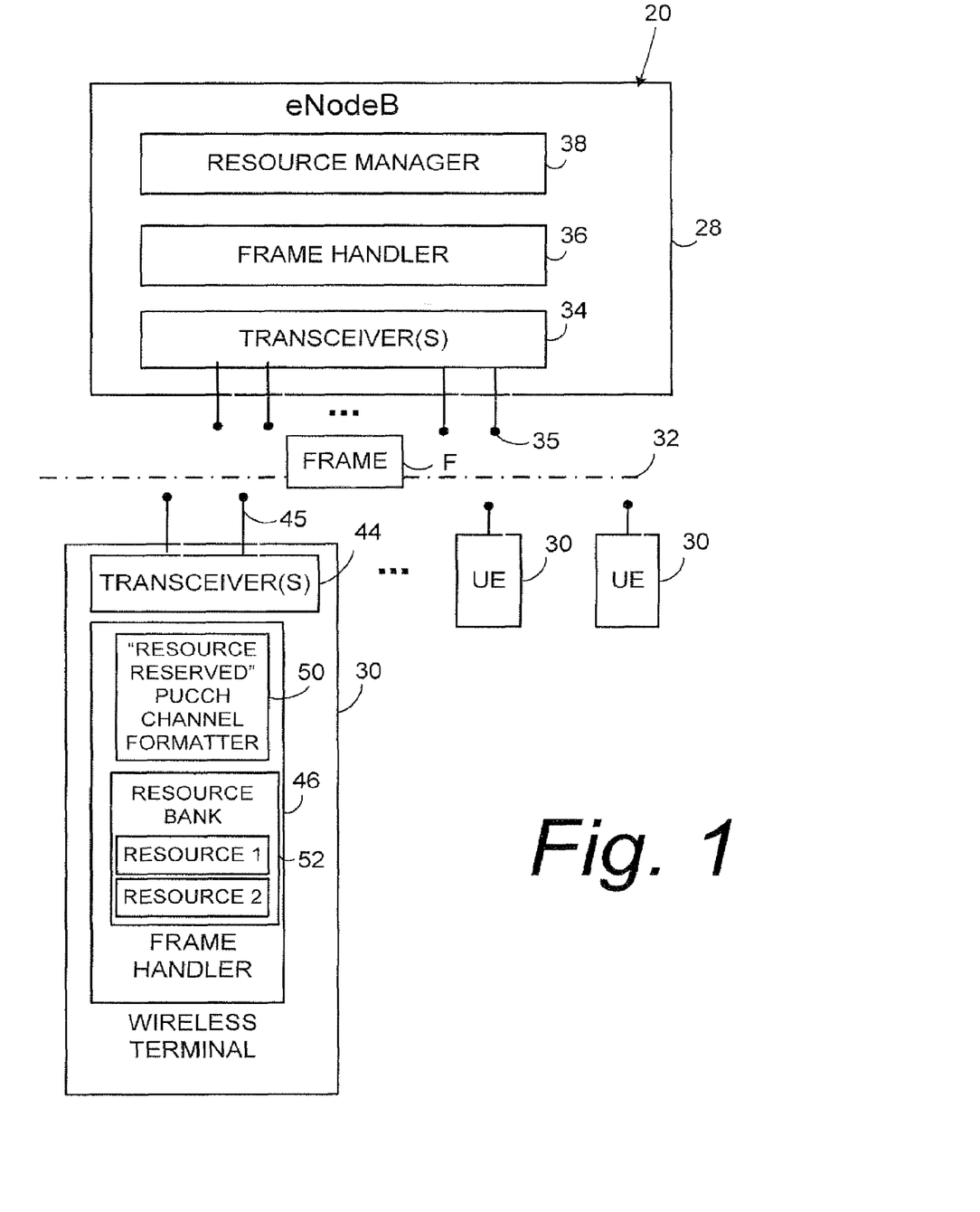
FIG. 1 is a schematic view of portions of a radio access network according to an example embodiment.

FIG. 1 shows portions of radio access network (RAN) of a telecommunications system 20, and particularly a node in the form of base station 28 or "eNodeB" which communicates with plural wireless terminals 30 or over a radio or air interface 32. It will be appreciated that the radio access network (RAN) typically comprises numerous other nodes, such as other base station nodes (and, in some embodiments, other nodes such as control nodes and the like). Only one node is shown in FIG. 1 for sake of simplicity, and only selected elements or functional units which are germane to the technology disclosed herein.

The base station 28 comprises one or more transceiver(s) 34 which is/are configured to transmit a frame F of information for transmission over the radio interface 32. For downlink transmission to the wireless terminals 30, the transceiver(s) 34 feed plural antennae 35 which function to provide plural sub-carriers. The transceiver(s) 34 thereby transmit symbols of the subframes of the frame F on the downlink (DL) on plural sub-carriers in a frequency domain.

The base station 28 also comprises base station frame handler 36. The subframe handler 36 is configured to prepare or format the frame F of information for transmission by transceiver(s) 34 on a downlink to the wireless terminals 30. In the illustrated example, the frame F is a time division duplex (TDD) frame comprising plural subframes. Some of the subframes are downlink (DL) subframes, others of the subframes are uplink (UL) subframes. Preferably the frame F is a type 2 TDD frame of the type described in 3GPP TS 36.211 V8.5.0 (2008-12) 3rd Generation Partnership Project; Technical Specification Group Radio Access Network; Evolved Universal Terrestrial Radio Access (E-UTRA); Physical Channels and Modulation (Release 8). As such, the frame F can have an LTE frame structure comprises ten subframes. Which of the subframes are uplink (UL) and which are downlink (DL) can be in accordance with the six differing uplink-downlink configurations previously described.

Figure 2:
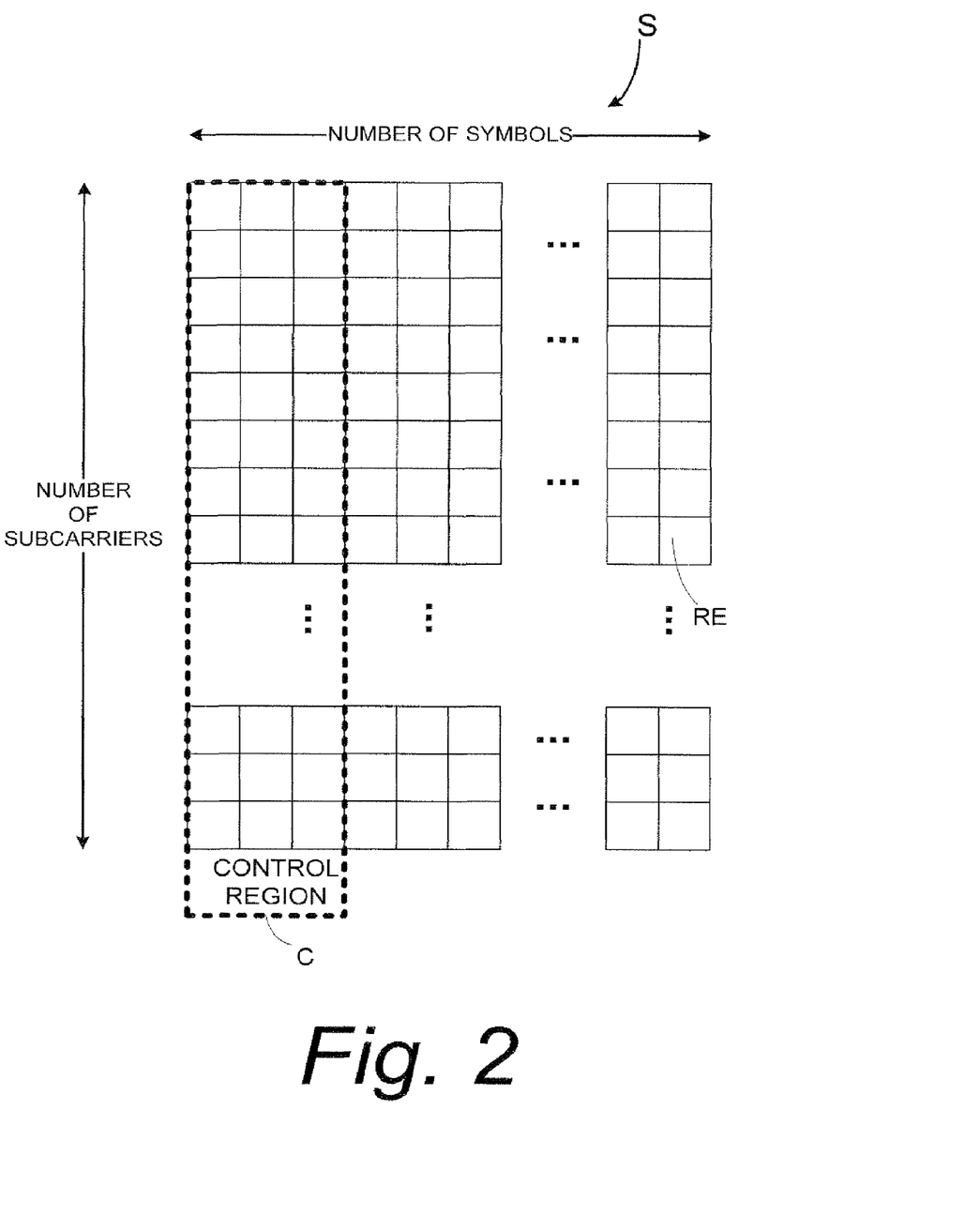
FIG. 2 is a diagrammatic view of a representative, sample subframe.

A representative, sample depiction of a subframe S is shown in FIG. 2. The subframe S is illustrated in the form of a downlink resource grid comprised of resource elements (RE). Each column of the two dimensional grid of FIG. 2 represents a symbol (e.g., an OFDM symbol); each row of the grid of FIG. 2 represents a subcarrier. A resource element (RE) is the smallest time-frequency unit for downlink transmission in the subframe S. That is, one symbol on one subcarrier in the sub-frame comprises a resource element. Typically a control channel element (CCE) has thirty six resource elements (REs). Details of an example subframe S and the resource grid are provided in 3GPP TS 36.211 V8.5.0 (2008-12) section 5.2.

The base station frame handler 36 has access to or (in some implementations) comprises resource manager 38. The resource manager 38 maintains and allocates resources for use the wireless terminal 30 and other wireless terminals (not illustrated). One of the types of resources which is supervised by resource manager 38 are PUCCH channel resources, described subsequently.

The wireless terminal 30 is shown in FIG. 1 as comprising transceiver(s) 44. The transceiver(s) 44 include or are connected to two wireless terminal antennas 45 (two antenna 45 being shown in the case of MIMO mode operation). The wireless terminal 30 also comprises wireless terminal frame handler 46. The wireless terminal frame handler 46 receives and processes the downlink (DL) subframes of Frame F and prepares and formats the uplink (UL) subframes of frame F. At least one of the uplink (UL) subframes prepared by wireless terminal frame handler 46 and transmitted by transceiver (s) 44 from wireless terminal 30 to base station 28 carries the Physical Uplink Control Channel (PUCCH). To this end, wireless terminal frame handler 46 is shown as comprising a PUCCH channel formatter which prepares the acknowledgement messages in a unique manner, and accordingly which is herein known as resource reserved PUCCH channel formatter 50.

The frame handler 46 of wireless terminal 30 is configured to prepare a Physical Uplink Control Channel (PUCCH) channel comprising up to four acknowledgements by using only two PUCCH channel resources and by using PUCCH format 1a or PUCCH format 1b.

Figure 3:
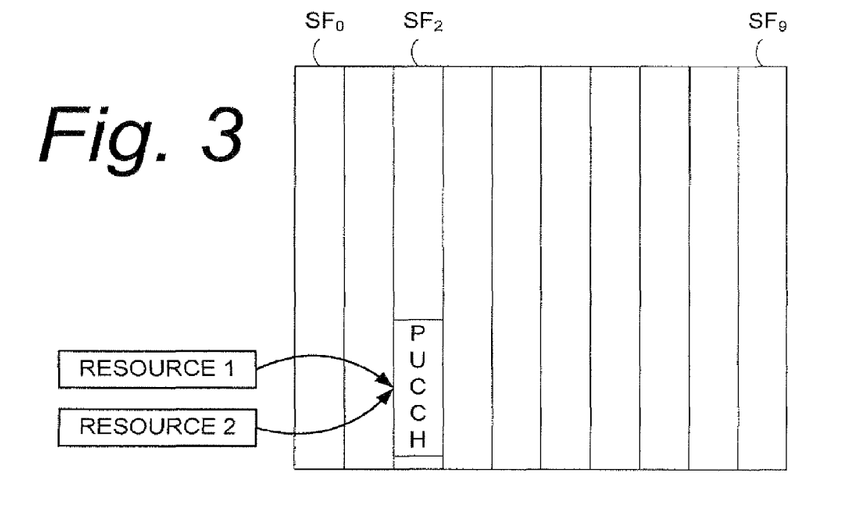
FIG. 3 is a diagrammatic view of an example frame, further showing a PUCCH channel and two channel resources utilized for acknowledgements.

FIG. 3 illustrates frame F as having ten subframes $SF_0$-$SF_9$ (each column of FIG. 3 essentially represents a subframe). By way of example, the third subframe (Subframe $SF_2$) is an uplink (UL) subframe which includes a PUCCH. FIG. 3 further illustrates that two PUCCH resources are available, e.g., assigned to wireless terminal frame handler 46, for transmitting the PUCCH. The two PUCCH resources are herein simply referred to as "resource 1" and "resource 2". As explained hereinafter, in some cases one of the PUCCH resources is used for transmitting the PUCCH; in one case either one or both of the PUCCH resources can be used for transmitting the PUCCH.

As used herein, a PUCCH channel resource is specified by a sequence utilized for transmission of at least part of the PUCCH channel and a cyclical shift applied to the sequence. The sequences utilized for the PUCCH channel resource can be, for example, constant amplitude zero auto-correlation (CAZAC) sequences. The two sequences of the respective two PUCCH resources are orthogonal, and the cyclical shift of the two PUCCH resources can be in a frequency domain, a time domain, or both the frequency domain and the time domain. A more detailed explanation of PUCCH channel resource is provided by 3GPP TS 36.211 V8.5.0 (2008-12) 3rd Generation Partnership Project; Technical Specification Group Radio Access Network; Evolved Universal Terrestrial Radio Access (E-UTRA); Physical Channels and Modulation (Release 8), sections 5.4 and 5.5, which is incorporated by reference herein in its entirety.

The resource manager 38 determines what resources are to be allocated to a frame, including what two resources are to be allocated to wireless terminal 30 for use on the PUCCH channel. The control portion of the frame transmitted from base station 28 to wireless terminal 30 may include an identification of the two particular PUCCH channel resources are assigned to wireless terminal 30. This enables wireless terminal 30 to know which two particular PUCCH channel resources are assigned to wireless terminal 30. The two PUCCH channel resources which are assigned to wireless terminal 30, or identifications thereof, (which for sake of simplified notation are denominated as "resource 1" and "resource 2") can be stored at wireless terminal 30 in a resource bank or memory 52 of wireless terminal frame handler 46.

As used herein, the term "acknowledgement" or "acknowledgements" or the like is intended generically to include both a positive acknowledgment (ACK) and a negative acknowledgement (NACK or NAK). Thus, the up to four (e.g., four or less) acknowledgements represented by the two PUCCH channel resources (such as resource elements R1 and R2 of FIG. 3) may constitute up to four positive acknowledgements, up to four negative acknowledgements, or a combination of (up to four total) positive and negative acknowledgements (e.g., both ACK(s) and NACK(s)).

In one of its aspects the technology disclosed herein concerns a method of operating a communication network wherein a time division duplex (TDD) frame of information is communicated over a radio interface between a wireless terminal and a base station node. The basic method is reflected generally by the example acts or steps shown in FIG. 4. Act 4-1 of FIG. 4 comprises base station 28 preparing the frame F. Act 4-2 comprises base station 28 transmitting frame F over air interface 32 to wireless terminal 30. Act 4-3 comprises the wireless terminal receiving plural downlink (DL) subframes of the frame. In response thereto, as act 4-2 the wireless terminal frame handler 46 of wireless terminal 30, and particularly resource reserved PUCCH channel formatter 50, configures the Physical Uplink Control Channel (PUCCH) channel to comprise up to four acknowledgements by using only two PUCCH channel resources and using PUCCH format 1a or PUCCH format 1b. Act 4-5 comprises transmission of the subframe having the PUCCH channel over air interface 32 to base station 28. Act 4-6 comprises base station 28 receiving and then processing/decoding the PUCCH channel, including the positive acknowledgements and any negative acknowledgements included therein.

Figure 4:
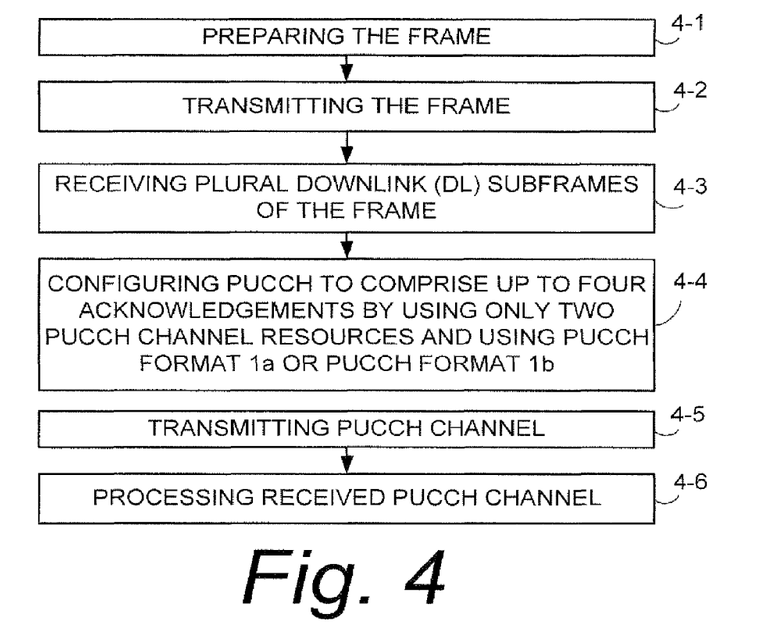
FIG. 4 is a flowchart illustrating example, representative, basic acts or steps that comprise a method executed or performed by an example wireless terminal in preparing a PUCCH channel.

It will be appreciated that the method of FIG. 4 encompasses a method of operating the wireless terminal 30, which is depicted, e.g., by act 4-3 and act 4-4 of FIG. 4.

In general, resource reserved PUCCH channel formatter 50 is configured to prepare the PUCCH channel as comprising N number of acknowledgements for N number of downlink (DL) subframes. How resource reserved PUCCH channel formatter 50 prepares or formats the PUCCH to utilize only two PUCCH channel resources to express up to four acknowledgements is described separately below with respect to each of four cases. In the first case N=1, in the second case N=2; and in the third case N=3, and in the fourth case N=4. The wireless terminal 30 knows which case is applicable by detecting how many downlink subframes are scheduled when receiving a corresponding PUCCH channel.

In the technology disclosed herein including various cases described below, the choice by resource reserved PUCCH channel formatter 50 of which of the two PUCCH channel resources (resource 1 or resource 2) imparts information in addition to the valued that is encoded by the selected code, and thus serves to provide base station 28 with extra information without actually having to transmit any extra data.

Figure 5:
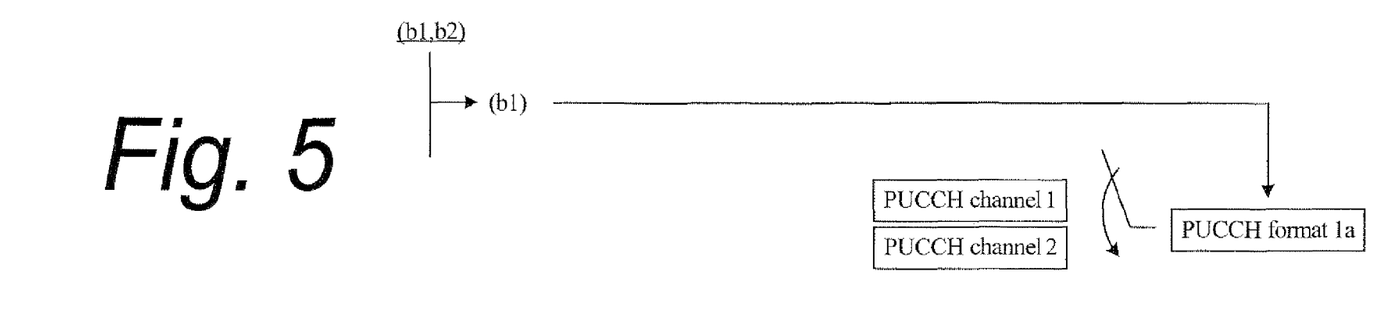
FIG. 5 is a diagrammatic view depicting an example embodiment and mode of formatting of PUCCH to utilize only two PUCCH channel resources to express one acknowledgement.

In the first case (N=1), illustrated by FIG. 5, the PUCCH channel is configured as comprising one acknowledgement for one respective downlink (DL) subframe. The one acknowledgement is depicted in FIG. 5 as bit b1, with bit b1 having a value (either 0 or 1) representing either a positive acknowledgement or a negative acknowledgement (NACK) for the DL subframe. In the first case bit b1 is used for selection among two PUCCH resources, only one is mapped for transmission. The base station 28 will know which resource is used for transmission by blind detection.

Figure 6:
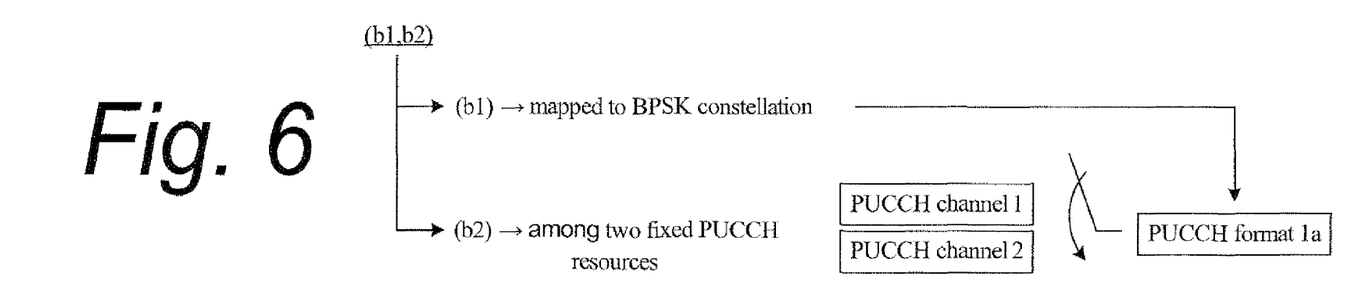
FIG. 6 is a diagrammatic view depicting an example embodiment and mode of formatting of PUCCH to utilize only two PUCCH channel resources to express two acknowledgements.

In the second case (N=2), illustrated by FIG. 6, the PUCCH channel is configured as comprising two acknowledgements for two respective downlink (DL) subframes. The two acknowledgements are depicted in FIG. 6 as bits b1, b2, with bit b1 having a value (either 0 or 1) representing either a positive acknowledgement or a negative acknowledgement (NACK) for a first DL subframe and with bit b2 having a value (either 0 or 1) representing either a positive acknowledgement or a negative acknowledgement (NACK) for a second DL subframe. In the second case, the method further comprises, and the resource reserved PUCCH channel formatter 50 is configured for, mapping a first acknowledgement bit to a BPSK constellation and including the BPSK constellation in the PUCCH channel; using a second acknowledgement bit to select one of the two PUCCH channel resources for transmission of the PUCCH channel; and, using the PUCCH format 1a for the PUCCH.

Figure 7:
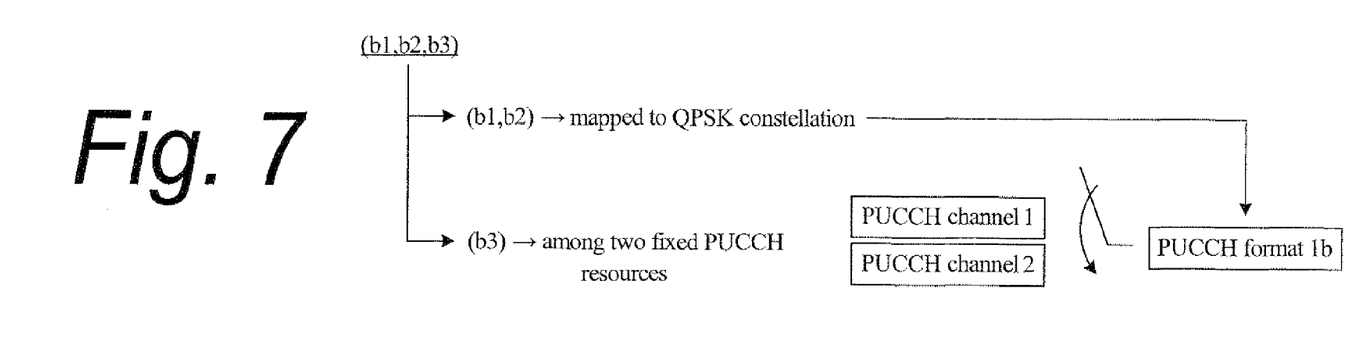
FIG. 7 is a diagrammatic view depicting an example embodiment and mode of formatting of PUCCH to utilize only two PUCCH channel resources to express three acknowledgements.

In the third case (N=3), illustrated by FIG. 7, the PUCCH channel is configured as comprising three acknowledgements for three respective downlink (DL) subframes. The three acknowledgements are depicted in FIG. 6 as bits b1, b2, b3, with bit b1 having a value (either 0 or 1) representing either a positive acknowledgement or a negative acknowledgement (NACK) for a first DL subframe; bit b2 having a value (either 0 or 1) representing a positive acknowledgement or a negative acknowledgement (NACK) for a second DL subframe; and bit b3 having a value (either 0 or 1) representing a positive acknowledgement or a negative acknowledgement (NACK) for a third DL subframe. In the third case, the method further comprises, and the resource reserved PUCCH channel formatter 50 is configured for, mapping a first acknowledgement bit (bit b1) and a second acknowledgement bit (bit b2) to a QPSK constellation and including the QPSK constellation in the PUCCH channel; using a second acknowledgement bit to select one of the two PUCCH channel resources for transmission of the PUCCH channel; and, using the PUCCH format 1b for the PUCCH.

Figure 8:
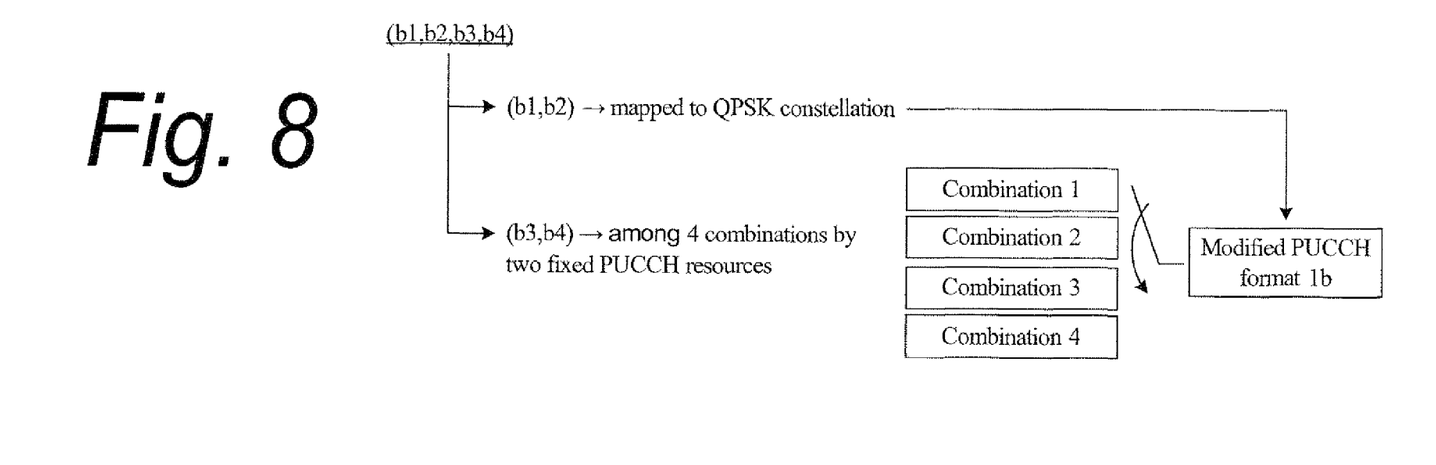
FIG. 8 is a diagrammatic view depicting an example embodiment and mode of formatting of PUCCH to utilize only two PUCCH channel resources to express four acknowledgements.

In the fourth case (N=4), illustrated by FIG. 8, the PUCCH channel is configured as comprising four acknowledgements for four respective downlink (DL) subframes. The four acknowledgements are depicted in FIG. 6 as bits b1, b2, b3, b4, with bit b1 having a value (either 0 or 1) representing a positive acknowledgement or a negative acknowledgement (NACK) for a first DL subframe; bit b2 having a value (either 0 or 1) representing a positive acknowledgement or a negative acknowledgement (NACK) for a second DL subframe; bit b3 having a value (either 0 or 1) representing a positive acknowledgement or a negative acknowledgement (NACK) for a third DL subframe; and bit b4 having a value (either 0 or 1) representing either an acknowledgement or a nack for a fourth DL subframe. In the fourth case, the method further comprises, and the resource reserved PUCCH channel formatter 50 is configured for, mapping a first acknowledgement bit (bit b1) and a second acknowledgement bit (bit b2) to a QPSK constellation; using a combination of the third acknowledgement bit and a fourth acknowledgement bit to select one of the two PUCCH channel resources for transmission of a first part of the PUCCH channel and to select one of the two PUCCH channel resources for transmission of a second part of the PUCCH channel.

Figure 9:
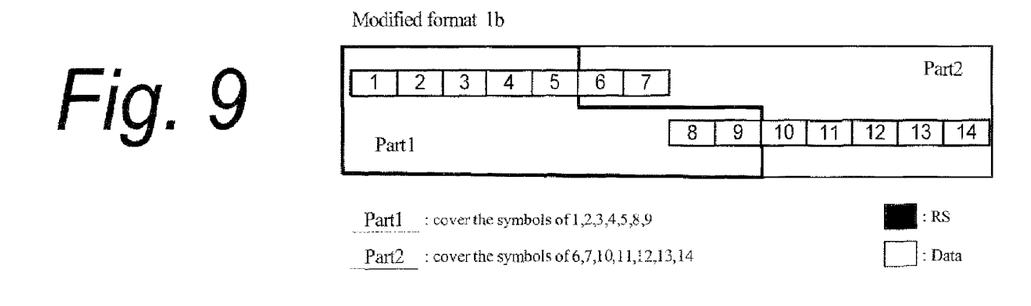
FIG. 9 is a diagrammatic view depicting splitting of a PUCCH channel into two different parts for an implementation of the embodiment and mode of FIG. 8.

In the fourth case discussed above and depicted by FIG. 8, format 1b is modified to support 4 bits, and can be done so in an example implementation in the manner as depicted in FIG. 9. As shown in FIG. 9, a PUCCH channel is split into two parts. In each part of the PUCCH channel, either resource1 or resource2 can be used for both data and the reference signal (RS) in terms of which combination is coded. The design of part1 and part2 in FIG. 9 is to satisfy the requirement that part1 and part2 have similar channel condition, especially on hopping based PUCCH. In FIG. 9, symbols 3-5 and 10-12 are reference signals; the remaining symbols (e.g., symbols 1-2, 6-7, 8-9, and 13-14) are data symbols. Data symbols 1-2 and 8-9 and reference signals 3-5 are associated with part 1; data symbols 6-7 and 13-14 and reference signals 10-12 are associated with part 2.

Thus, in the embodiment and mode of FIG. 8 wherein the PUCCH channel is configured as comprising four acknowledgements, in the example implementation of FIG. 9 the method can further comprise splitting the PUCCH into a PUCCH channel first part (part 1) and a PUCCH channel second part (part 2). Part 1 of the PUCCH channel can be encoded by either resource 1 or resource 2, and likewise part 2 of the PUCCH channel can be encoded by either resource 1 or resource 2. The method further comprises using a combination of the values of the third acknowledgement bit and the fourth acknowledgement bit in order to determine which resource (i.e., either resource 1 or resource 2) is to be used for transmission of part 1 of the PUCCH channel and which resource (i.e., either resource 1 or resource 2) is to be used for transmission of part 2 of the PUCCH channel.

Figure 10:
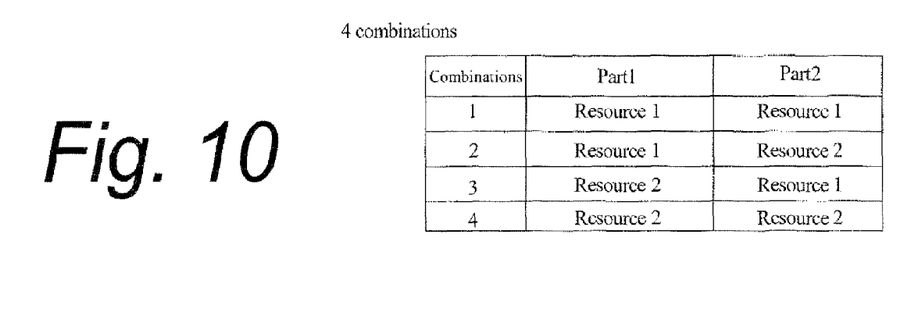
FIG. 10 is a diagrammatic view depicting how combinations of channel resources for differing parts of a PUCCH can be utilized and interpreted.

FIG. 10 shows how the combinations of the third acknowledgement bit and the fourth acknowledgement bit can be utilized for resource selection. For example, if acknowledgement bits 3 and 4 have the values 0, 0 to reflect two positive acknowledgements, then resource 1 would be selected for transmission of both part 1 of the PUCCH channel and part 2 of the PUCCH channel.

If the acknowledgement bits 3 and 4 have the values 0, 1 to reflect a positive acknowledgement for bit 3 and a negative acknowledgement for bit 4, then resource 1 would be selected for transmission of part 1 of the PUCCH channel and resource 2 would be selected for transmission of part 2 of the PUCCH channel.

If the acknowledgement bits 3 and 4 had the values 1, 0 to reflect a negative acknowledgement for bit 3 and a positive acknowledgement for bit 4, then resource 2 would be selected for transmission of part 1 of the PUCCH channel and resource 1 would be selected for transmission of part 2 of the PUCCH channel.

Lastly, if the acknowledgement bits 3 and 4 had the values 1, 1 to reflect a negative acknowledgement for both bit 3 and bit 4, then resource 2 would be selected for transmission of part 1 of the PUCCH channel and resource 2 would be selected for transmission of part 2 of the PUCCH channel.

It will be appreciated that the acknowledgement (ACK)/negative acknowledgement (NACK) bits are mapped into BPSK or QPSK symbols according to the rule of Table 5.4-1 of section 5.4 of 3GPP TS 36.211 V8.5.0 (2008-12), which is incorporated herein by reference.

FIG. 6-FIG. 10 thus describe various ways the resource reserved PUCCH channel formatter 50 can configure the PUCCH channel according to respective cases and modes described herein. From the foregoing description of PUCCH channel preparation/configuration it will be appreciated how the base station frame handler 36 can, with its knowledge of resources assigned to wireless terminal 30, interpret and process (e.g., at act 4-6 of FIG. 4) the PUCCH channel received from wireless terminal 30. In this regard, the base station 28 knows how many subframes are scheduled for a certain wireless terminal 30, i.e., the number of feedback acknowledgements/negative acknowledgements (e.g., whether case 1, case 2, case 3, or case 4 applies). The base station 28 then performs blind detection in each combination. From the point of view of base station 28, the used combination should have best received SNR after receiver detection. So a general search among candidate combinations can be applied for the blind detection. By determining which of the particular PUCCH channel resources (resource 1 or resource 2) was used by the resource reserved PUCCH channel formatter 50 of wireless terminal 30 to encode part or all of the PUCCH channel, the base station 28 is able to ascertain information in addition to the information content that was encoded using the PUCCH resource.

Figure 11A:
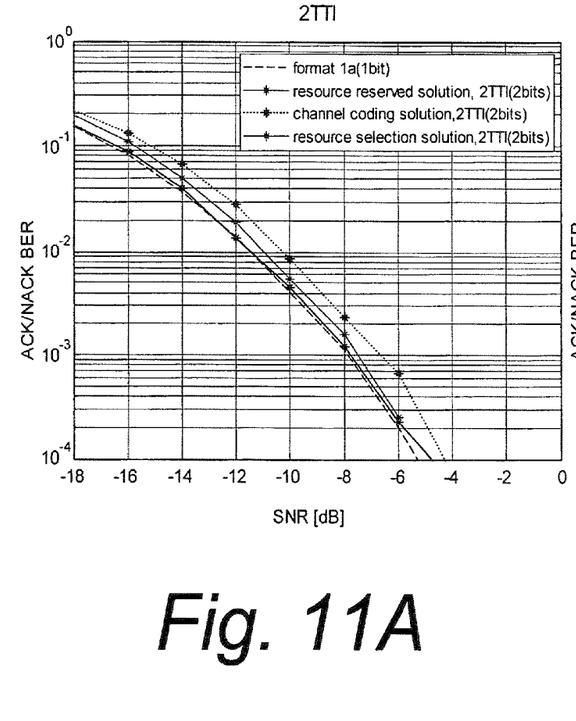
FIG. 11A and FIG. 11B are graphs comparing, for two different cases, BER performance of the resource selection solution described herein with the resource reserved solution and the channel coding solution.
Figure 11B:
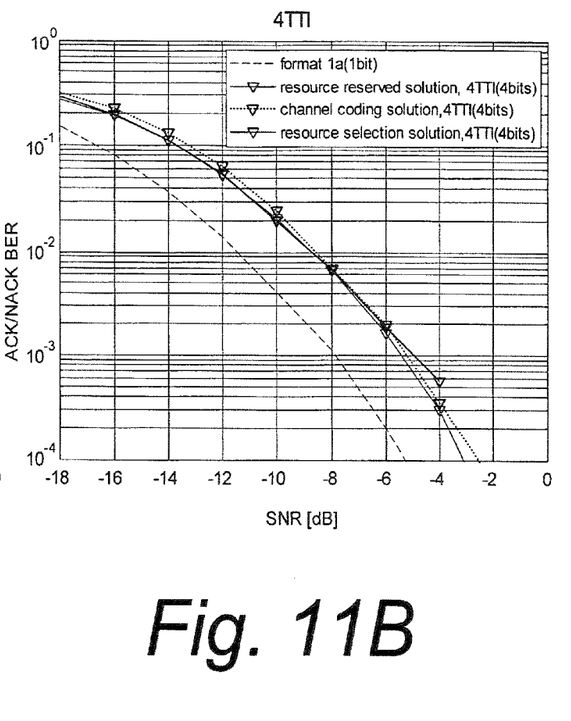

FIG. 11A and FIG. 11B compare the bit error rate (BER) performance of the resource selection solution described herein with other solutions (e.g., resource reserved solution and channel coding solution) in a low speed of 3 km/h. FIG. 11A is for the case of two downlink subframes; FIG. 11B is for the case of four downlink subframes. Simulations show resource selection solution can attain similar bit error rate (BER) performance. But with the resource selection solution only two PUCCH resources are needed for both two DL subframe acknowledgement (FIG. 11A) and four DL subframe acknowledgement (FIG. 11B).

In addition, the resource selection solution described herein can allocate the two PUCCH resources in a more flexible way jointly in frequency domain and time domain. That is, there are various ways to generate two PUCCH resources (e.g., two orthogonal sequences used for transmission of PUCCH channel). One example way is to generate two PUCCH channel resources with 2 cyclic shifts with the same orthogonal cover. Another example way is to generate two PUCCH channel resources using one cyclic shift with two different orthogonal covers. As used herein, "orthogonal cover" is used in formats 1a/1b in the time domain, while cyclic shifts are used in formats 1a/1b/2 in the frequency domain. Orthogonal cover is used for PUCCH format 1a/1b in time domain, e.g. it refers to a length-3 orthogonal codes.

Thus, the resource selection solution described herein can be extended to cover 1, 2, 3 and 4 ACK/NACK feedback on PUCCH for both TDD and FDD with only two PUCCH resources, as either: 1 ACK/NACK: 2 resources (2 channels)+ known symbol (format 1a); 2 ACK/NACK: 2 resources (2 channels)+BPSK (format 1a); 3 ACK/NACK: 2 resources (2 channels)+QPSK (format 1b); or 4 ACK/NACK: 2 resources (4 combinations)+QPSK (modified format 1b).

The resource selection solution described herein can be applied in a system adopting or using code division multiplexing (CDM) to distinguish channels.

The resource selection solution described herein is based on using two fixed PUCCH resources to support multiple ACK/NACK on PUCCH and has some advantages as:

The association between DL CCE and PUCCH resources can be managed in an easy and unified way (e.g., supporting up to 4 ACK/NACK feedbacks in an unified way for both TDD and FDD).

Flexible resource allocation in joint frequency domain and time domain.

Low complexity due to blind detection among possibly two PUCCH channels (e.g., Blind detection is possibly processed at the eNodeB among two PUCCH resources).

Saving PUCCH resources with the same higher layer configurations (Compared to resource reserved solution, the resource selection solution described herein can save more PUCCH resources due to only two resources needed).

The mapping rule between DL CCE and PUCCH resources and is not required and the resource selection solution described herein utilizes only part of DL information to allocate the two PUCCH resources.

Compared to channel coding solution, the resource selection solution described herein is based on format 1a/1b and has the same higher layer configuration as one or two ACK/NACK feedback.

Simulations show that the resource selection solution described herein can attain similar BER performance as the resource reserved solution and the channel coding solution.

PCT/SE2008/051067, entitled "TELECOMMMUNICATION METHOD AND APPARATUS", incorporated herein by reference, concerns, e.g., an improved ACK/NACK bundling scheme for LTE PUCCH and mentions the concept of resource selection. However, the resources used on the PUCCH channel in PCT/SE2008/051067 are only referred to cyclic shifts in frequency domain, i.e. multiple CAZAC sequences. However, the resource selection solution described herein expands the resource to either cyclic shifts in frequency domain or orthogonal covers in time domain, or both. The technology disclosed herein provides a new method of resource allocation, e.g. either in frequency domain or in time domain. Advantageously, a more flexible allocation can be scheduled in advance. In addition, the technology disclosed herein shows how to support multiple ACK/NACK and presents detailed schemes (while PCT/SE2008/051067 talks about how to improve ACK/NACK bundling).

The person skilled in the art will understand that a typical base station node or ENodeB, and a typical wireless terminal, have many functional units and structures other than those shown in FIG. 1, and for which description need not be included herein. Moreover, it will be appreciated that the base station frame handler 36 and wireless terminal frame handler 46, including resource reserved PUCCH channel formatter 50, can be realized by a controller or processor as those terms are herein expansively explained.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal comprising:
   a transceiver configured to communicate a frame of information over a radio interface with a base station node;
   a frame handler configured to prepare a Physical Uplink Control Channel (PUCCH) comprising three acknowledgment bits for three downlink subframes by using only two PUCCH channel resources;
   wherein a first acknowledgment bit and a second acknowledgment bit are mapped to a modulation constellation which is included in the PUCCH channel; and
   wherein a third acknowledgment bit is used to select one of the two PUCCH channel resources for transmission of the PUCCH channel.

2. The apparatus of claim 1, wherein a PUCCH channel resource is specified by a sequence utilized for transmission of at least part of the PUCCH channel and a cyclical shift applied to the sequence, wherein sequences of the two PUCCH resources are orthogonal, and wherein the cyclical shift of the two PUCCH resources is in a frequency domain, a time domain, or both the frequency domain and the time domain.

3. The apparatus of claim 1, wherein
   the PUCCH format 1b is used for the PUCCH channel.

4. A method of operating a communications network comprising a base station and a wireless terminal which communicate a frame of information over a radio interface, the method comprising:
   the wireless terminal receiving plural downlink (DL) subframes of the frame and in response thereto;
   configuring a Physical Uplink Control Channel (PUCCH) to comprise three acknowledgment bits for three downlink subframes by using only two PUCCH channel resources;
   mapping a first acknowledgment bit and a second acknowledgment bit to a modulation constellation and including the modulation constellation in the PUCCH channel; and
   using a second acknowledgment bit to select one of the two PUCCH channel resources for transmission of the PUCCH channel.

5. The apparatus of claim 4, wherein a PUCCH channel resource is specified by a sequence utilized for transmission of at least part of the PUCCH channel and a cyclical shift applied to the sequence, wherein sequences of the two PUCCH resources are orthogonal, and wherein the cyclical shift of the two PUCCH resources is in a frequency domain, a time domain, or both the frequency domain and the time domain.

6. The method of claim 4, wherein the PUCCH format 1b is used for the PUCCH channel.

7. A base station of a communications network comprising:
   a base station frame handler configured to allocate only two PUCCH channel resources to a wireless terminal;
   a transceiver configured to communicate a frame of information over a radio interface with the wireless terminal;
   wherein the base station frame handler is further configured to detect three acknowledgment bits for three downlink subframes in a Physical Uplink Control Channel (PUCCH) channel received from the wireless terminal, and wherein the base station frame handler processes the PUCCH channel in accordance with:
   a first acknowledgment bit and a second acknowledgment bit having been mapped to a modulation constellation which is included in the PUCCH channel; and
   a third acknowledgment bit having been used to select one of the two PUCCH channel resources for transmission of the PUCCH channel.

8. The apparatus of claim 7, wherein a PUCCH channel resource is specified by a sequence utilized for transmission of at least part of the PUCCH channel and a cyclical shift applied to the sequence, wherein sequences of the two PUCCH resources are orthogonal, and wherein the cyclical shift of the two PUCCH resources is in a frequency domain, a time domain, or both the frequency domain and the time domain.

9. The apparatus of claim 7, wherein
   the PUCCH format 1b is used for the PUCCH channel.

* * * * *